(12) United States Patent
Antipa

(10) Patent No.: US 9,460,062 B2
(45) Date of Patent: Oct. 4, 2016

(54) LOCAL RENDERING OF AN OBJECT AS AN IMAGE

(71) Applicant: Adobe Systems Incorporated, San Jose, CA (US)

(72) Inventor: Damien Antipa, Basel (CH)

(73) Assignee: Adobe Systems Incorporated, San Jose, CA (US)

( * ) Notice: Subject to any disclaimer, the term of this patent is extended or adjusted under 35 U.S.C. 154(b) by 311 days.

(21) Appl. No.: 14/143,591

(22) Filed: Dec. 30, 2013

(65) Prior Publication Data

US 2015/0185994 A1      Jul. 2, 2015

(51) Int. Cl.
*G06F 17/00*       (2006.01)
*G06F 17/22*       (2006.01)
*G06F 17/21*       (2006.01)

(52) U.S. Cl.
CPC ......... *G06F 17/2247* (2013.01); *G06F 17/212* (2013.01); *G06F 17/227* (2013.01); *G06F 17/2235* (2013.01)

(58) Field of Classification Search
CPC ..................... G06F 17/2235; G06F 17/30014
USPC ................................................. 715/200, 205
See application file for complete search history.

(56) References Cited

U.S. PATENT DOCUMENTS

| | | | | |
|---|---|---|---|---|
| 6,456,305 B1* | 9/2002 | Qureshi | ............ | G06F 17/30905 707/E17.121 |
| 7,873,946 B2* | 1/2011 | Lathrop | ............ | G06F 17/30271 715/204 |
| 8,020,089 B1* | 9/2011 | Brichford | ............ | G06F 17/2247 715/234 |
| 8,549,395 B2* | 10/2013 | Graves | ............ | G06F 17/30905 715/234 |
| 8,972,881 B2* | 3/2015 | Fujita | ............ | G06F 3/0486 715/769 |
| 2004/0210833 A1* | 10/2004 | Lerner | ............ | G06F 3/04883 715/201 |
| 2007/0242082 A1* | 10/2007 | Lathrop | ............ | G06F 17/30271 345/619 |

(Continued)

OTHER PUBLICATIONS

Badros et al., A Constraint Extension to Scalable Vector Graphics, ACM 2001, pp. 489-498.*

(Continued)

*Primary Examiner* — Cong-Lac Huynh
(74) *Attorney, Agent, or Firm* — Kilpatrick Townsend & Stockton LLP

(57) ABSTRACT

Techniques for locally rendering an object as an image may be provided. For example, an application may be executed by a computing device to access and retrieve information from a network-based resource and may display the retrieved information to a user of the computing device. In response to identifying (e.g., by way of a user selection or an automated selection) of an object within the displayed information, the application may locally process the object to generate a graphics object. Further, the application may configure the graphics object to support image-rendering operations by, for example, importing properties from the object into the graphics object and storing the graphics object as binary data at a location in a local memory of the application. Subsequently, the application may use the binary data and the location in the local memory to render an image based on the graphics object.

20 Claims, 6 Drawing Sheets

(56) References Cited

U.S. PATENT DOCUMENTS

| | | | |
|---|---|---|---|
| 2007/0283251 A1* | 12/2007 | Pally | G06F 17/24 715/234 |
| 2010/0011284 A1* | 1/2010 | Ramakrishna | G06F 17/3089 715/234 |
| 2010/0172594 A1* | 7/2010 | Priddle | G06T 11/60 382/253 |
| 2010/0269056 A1* | 10/2010 | Fujita | G06F 3/0486 715/760 |
| 2011/0145694 A1* | 6/2011 | Graves | G06F 17/30905 715/234 |
| 2014/0040771 A1* | 2/2014 | Tong | G06F 3/04817 715/752 |
| 2014/0225928 A1* | 8/2014 | Konnola | G06F 17/30899 345/636 |
| 2015/0095763 A1* | 4/2015 | Wang | G06F 9/455 715/234 |

OTHER PUBLICATIONS

Probets et al., Vector Graphics: From PostScript and Flash to SVG, Google 2001, pp. 135-143.*

Limper et al., Fast, Progressive Loading of Binary-Encoded Declarative-3D Web Content, IEEE Oct. 2013, pp. 26-36.*

Probets et al., Vector Graphics: From PostScript and Flash to SVG, ACM 2001, pp. 135-143.*

* cited by examiner

LOCAL RENDERING OF AN OBJECT AS AN IMAGE

TECHNICAL FIELD

This disclosure relates generally to computer-implemented methods and systems for rendering objects, such as markup language elements, as images.

BACKGROUND

A web browser of a computing device typically renders a hypertext markup language (HTML) document, such as a web page, that includes an HTML object. In some situations, the rendered HTML object can include text and image elements. After rendering the HTML document, it may be desirable to further transform the rendered HTML object into an image so that filters, effects or other manipulations can be applied within the rendered HTML document. For example, a user of the computing device may desire to perform drag and drop, a colored multiply or highlighting effect, or other image-rendering operations on the rendered HTML object. However, there is typically no native functionality included in the web browser for allowing the image-rendering operations to be performed directly on the rendered HTML object.

Instead, prior solutions require the web browser, or other application executed by the computing device, to transmit the HTML object to a server over a network. In turn, the server renders the HTML object as an image by using, for example, a headless browser and returns the image to the computing device. The web browser then renders the image within the HTML document to complete the image-rendering operation. However, this interaction between the computing device and the server may be costly in terms of computational time and may be prohibitive in certain circumstances. For example, the user may perceive an unacceptable delay between the time an image-rendering operation is initiated (e.g., an HTML object is selected) and the time the rendering operation completes (e.g., the image is rendered and a highlighting is applied thereto). Similarly, a connection over the network may not exist between the computing device and the server when the image-rendering operation is initiated and, thus, the operation may not be performed.

SUMMARY

In certain embodiments, a web browser or other application executed by a computing device locally generates an image from an HTML object so that image-rendering operations can be performed on the image. For instance, the web browser may render an HTML document that contains HTML objects. An HTML object included within the HTML document may be identified in association with an image-rendering operation. To locally support the image-rendering operation, the web browser may transform the HTML object into an image and may store the image in an address of a local memory of the computing device. Further, the web browser may attach an image element to the HTML document at a location of the HTML object and may use the image element of the HTML document to render the image stored in the local memory. As such, the web browser can locally render the image within the HTML document and can apply image-rendering operation to the image without needing to communicate with a server or an external computing device over a network.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

Embodiments of techniques according to the present invention are described in detail below with reference to the following drawings.

DETAILED DESCRIPTION

Figure 1:
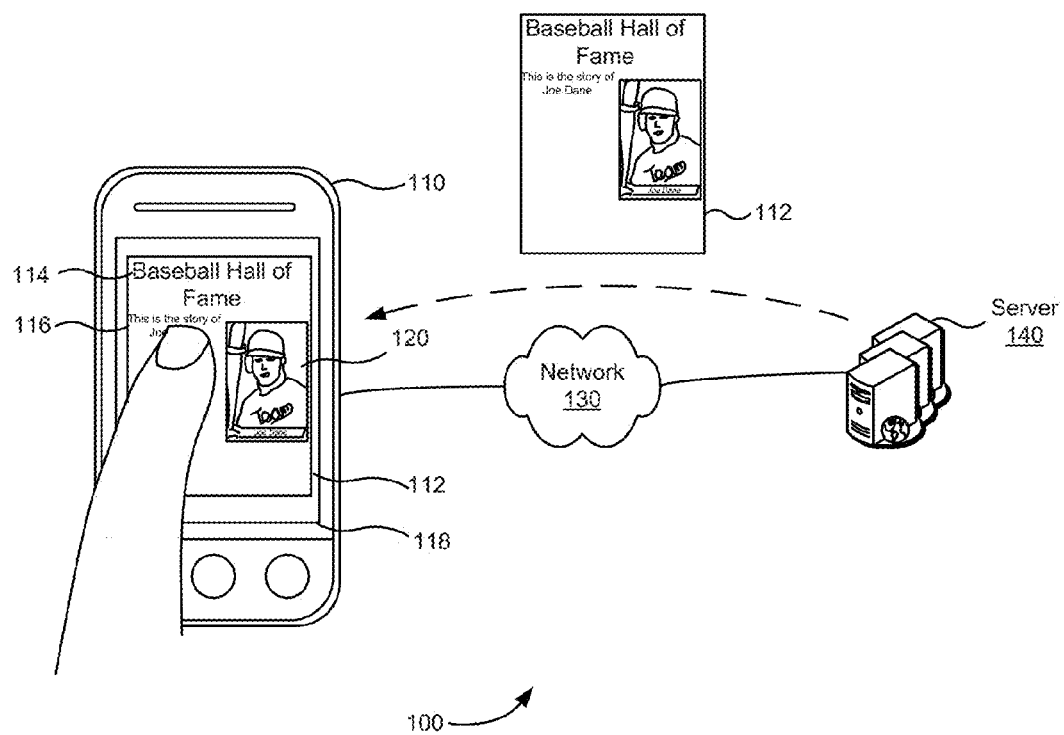
FIG. 1 illustrates an example computing environment for obtaining and rendering content, according to certain embodiments of the present invention.

Generally, the embodiments described herein are directed to functionality for a web browser to perform image-rendering operations on HTML renderings. More particularly, the web browser may locally transform an HTML object into an image to support image-rendering operation. For example, the web browser may render an HTML document, such as a web page, that includes an HTML object that, in turn, contains text and image elements. A user may desire to perform an image-rendering operation on the rendered HTML object. For example the user may desire to drag and drop the rendered HTML object from one location to another location within the rendered HTML document, to highlight the rendered HTML object in the rendered HTML document, or to save the rendered HTML object as an image by right clicking on the rendered HTML object and selecting a save operation. To support the image-rendering operation, the web browser may locally perform a number of steps. For example, the web browser may transform the HTML object into a corresponding image and may store the image in a local memory. Further, the web browser may attach an image element to the HTML document in a location of the HTML object and may reference the image as a source of the image element. In addition, the web browser may use the image element of the HTML document at the location of the HTML object to render an image and may apply the image-rendering operation on the rendered image. As such, the web browser is capable of locally transforming an HTML object that contains, for example, text elements into an image to perform the image-rendering operation. In other words, the web browser need not connect to a server or external computing device to request and receive an image of the HTML object, allowing the web browse to save computational time, reduce bandwidth usage, and overcome potential network connectivity limitations.

In an example embodiment, to transform the HTML object into the image, the web browser may initially generate an empty scalable vector graphics (SVG) object configured to include multiple elements. Further, the web browser may modify the elements of the HTML object according to a SVG format and may copy the modified elements to the SVG object. The web browser may store the SVG object, including the corresponding elements, as the image in the local memory As used herein, a "computing device" refers to any type of computing device configured to communicate with another computing device over a network to access information, including portable computing devices and conventional computing devices. A portable computing device may allow mobility to the user during at least operation and may include, for example, a mobile phone, a smart phone, a personal digital assistant (PDA), a phablet, a tablet, and other portable computing devices. In comparison, a conventional computing device may be more stationary, may include larger processing power and memory space than the ones of a portable computing device, and may have an operating system that may be more sophisticated than the one of a portable computing device. A laptop, a personal computer, a desktop computer, and a server are examples of conventional computing devices.

As used herein, an "application" refers to a program configured to access and retrieve information hosted on a remote computing system (e.g., an HTML document from a web site hosted on a server) and to render the information at a user interface. Examples of such an application include a web browser, a script or a plug-in that runs within a web browser, a program that is hosted in a web browser, a program that is separate from but that interfaces with a web browser, and other types of programs capable of using local memory and a rendering engine to access and render information.

As used herein, a "document" refers to an electronic document that can be rendered by an application. The document may have a markup format, such as HTML.

As used herein, a "markup language" refers to a language for annotating a document to allow an application to render the document.

As used herein, an "image-rendering operation" refers to an operation that an application may execute on an image. Image drag and drop, highlight, and save operations are examples of an image-rendering operation.

As used herein, an "object" refers to a combination of elements. In some situations, the object may have a complex structure that nests the elements, where the elements may be of various types, such as text elements, image elements, and other types of elements. Further, the object may have a markup format, such as HTML, SVG, and other formats.

As used herein, an "image element" refers to an element that includes ore reference an image for the content of the element. For example, an image element attached to an HTML document may include a reference to a source that stores a corresponding image or may include the image itself. A web browser that renders the HTML document may read the image element to render the image.

As used herein, a "direct object model (DOM)" refers to a cross-platform and language-independent convention for representing and interacting with elements and objects that have different formats, such as HTML, extensible markup language (XML), and extensible hypertext markup language (XHTML).

In the interest of clarity of explanation, various example embodiments are described in the context of an HTML document, HTML objects, and SVG objects. Nevertheless, the principles of the embodiments can be applied to other types of documents and objects, including documents and objects that support other markup language formats. Specific details of various exemplary embodiments of the present invention are set forth in the following description and are illustrated in FIGS. 1-6. The various embodiments described herein can be implemented in hardware, software, or a combination thereof. In the figures, similar symbols may identify similar components, unless context dictates otherwise. Certain well-known technology details, such as methods, apparatuses, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

FIG. 1 illustrates an example computing environment 100 for implementing certain embodiments of the present invention. More particularly, a user may operate a computing device 110 to access information stored at a network-based resource (e.g., a web page) hosted on a remote server 140 over a network 130.

The server 140 may be configured to host one or more network-based resource (e.g., websites). Information available at these resources (e.g., web-pages) may be accessible to computing devices (e.g., the computing device 110) that connect to the server 140 over one or more networks. The server 140 may include a portable computing device, a conventional computing device, or a combination of the two. The server 140 may also include a number of computing devices clustered as a computing system. A content data network, a datacenter, and a server farm are examples of such computing system. The network 130 may be a communication network configured to connect the computing device 110 and the server 140 and may include, for example, any one or a combination of many different types of networks, such as cable networks, the Internet, wireless networks, cellular networks, and other private and/or public networks.

To facilitate the interaction with the user, the computing device 110 may be configured with a display screen for displaying a user interface. The computing device 110 may also be configured with requisite hardware and/or software for enabling touch screen and other input technologies for allowing the user to interact with information rendered on the display screen in the user interface. The user interface may include one or more windows that may display outputs of and may allow inputs to one or more application. A web browser is an example of such an application and may be configured to access and retrieve information hosted on the server 140 (e.g., a web page) and to render the information in the user interface. Other programs may also or alternatively be implemented by a computing device 110 to provide similar functions, such as an application that may use local memory and may access a rendering engine and other components. These programs may include, for example, a script or a plug-in that runs within a web browser, a program that is hosted in a web browser, a program that is separate from but that interfaces with a web browser, and other types of programs. As used herein, an application 118 may refer to any of these and other types of programs and may comprise instructions that when executed by a processor, cause a computing device 110 to perform the functions and operations of the present invention, as described herein.

As illustrated in FIG. 1, the information retrieved from the server 140 may be rendered as a document 112. The document 112 may contain numerous elements that may be represented using various techniques, such as by using markup language. An HTML document (e.g., a web page) is an example of the document 112. Elements can have different attributes, and may nest additional elements. These elements may allow text, image, audio, video, animation, multimedia and other types of presentations. Further, any number of these elements can be combined into objects. In other words, an object may have, in some situations, a complex structure that may include a large number of nested elements.

As shown in the figure, the example document 112 contains two elements 114 and 116 and an object 120. Element 114 represents a title of the document 112 and contains text that may have a certain font and style ("Baseball Hall of Fame" with a large font as shown in FIG. 1). Similarly, element 116 represents a paragraph within a body of the document 112 and contains text that may have a certain font and style ("This is the story of Joe Dane" with a smaller font than element 114 as shown in FIG. 1). The object 120 includes a combination of elements, including image and text elements (e.g., elements representing an image and the name of the baseball player), as further described in FIG. 2.

The application 118 may include functionality for allowing the user to select any of the elements 114, 116 and/or the objects 120 once the document 112 is presented at the user interface. Various selection techniques may be available depending on the capabilities of the application 118 and the computing device 110. For example, application 118 may include functionality for allowing the user to select object 120 by clicking, swiping, or performing a certain touch screen action or gesture in the vicinity of the displayed object 120. Additionally or alternatively, the user may provide a voice command that application 118 may translate into a selection of object 120. Although the disclosure describes techniques for selecting and processing an object such as object 120, similar techniques may also be available to select and process any other element(s), object(s), or combination(s) of element(s) and/or object(s) included in a document or any other content.

The user's selection of the object 120 may indicate a desire to further process or manipulate the object 120. For example, the user may desire to receive additional information about the content that the object 120 may represent or may want to move the object 120 from one location to another on the user interface. In some contexts, these and other operations may require the object 120 to be rendered as an image. For example, at a minimum, highlighting that the user has indeed selected the object 120 may require the application 118 to apply an effect (e.g., a highlighting mask) to an image of the object 120. In some cases, such an effect cannot be applied if the object 120 is merely displayed as an integrated portion of the rendered information (e.g., an image cannot be separately generated and rendered directly from the object 120).

As such, and in order to handle, for example, image-rendering operations, the application 118 may generate a graphics object that contains the elements of the object 120 and may format these elements according to a graphics format of the graphics object. The application 118 may store the graphics object in local memory such that an image can be rendered therefrom and image-rendering operations can be performed thereon. These and other aspects of the present invention are further described herein below.

Figure 2:
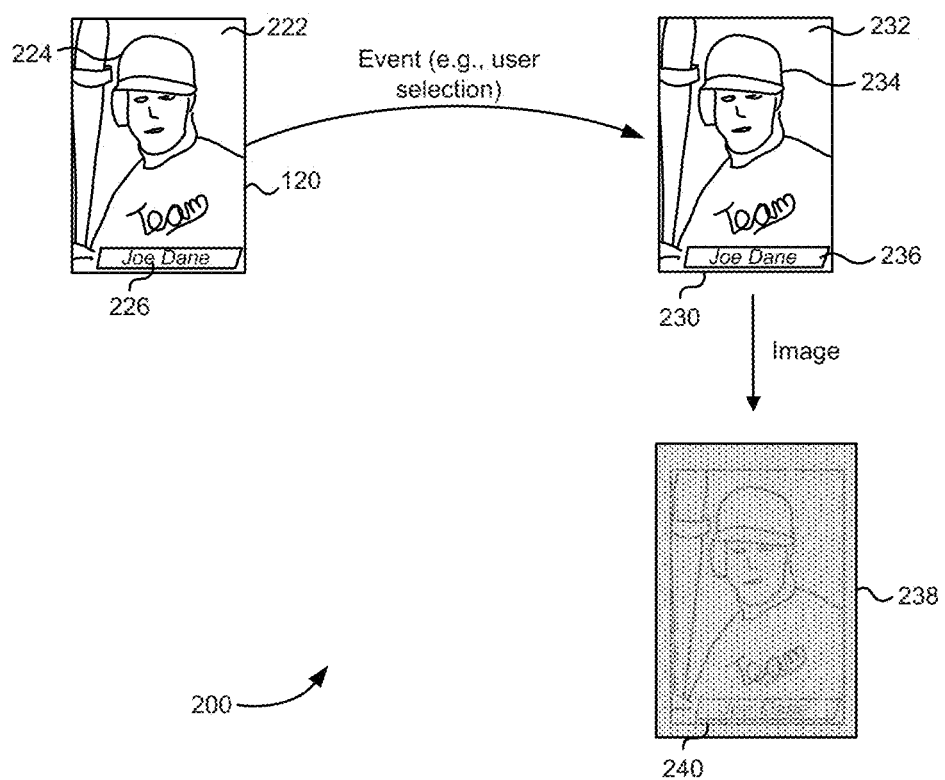
FIG. 2 illustrates an example transformation of a selected object, according to certain embodiments of the present invention.

Turning to FIG. 2, that figure illustrates an output of processing the object 120 by the application 118. More particularly, the application 118 may generate a graphic object 230 corresponding to the object 120. Unlike the object 120, the graphics object 230 may be configured to support image-rendering operations as part of the rendered document 112. In an example, the application 118 may configure the graphics object 230 such that an a binary large object (BLOB) can be locally generated and stored from the graphics object 230. The application 118 may use the BLOB to render an image 240 at the computing device 110 without connecting to the server 140 and such that the image-rendering operations can be locally applied to the generated image 240.

The application 118 may start and complete a process for generating the graphics object 230 and/or the image 240 based on one or more events. As illustrated in FIG. 2, when a user selection of the object 120 is received, the application 118 may initiate the process. The user selection is an example of such events. However, other events may also or alternatively be used. For example, when the document 112 is first received at the computing device 110, the application 118 may automatically initiate the process for some or all of the objects in the document 112 and may store the generated graphics objects and/or images locally. This can be done before or after the document 112 is rendered on the user interface. In another example, the application 118 may interface with a second application that is hosted on the computing device 110 and that receives the document 112 from the server 140. This second application may send the object 120 to the application 118. In turn, the application 118 may initiate the process for generating the graphics object 230 and/or the image 240 and may send the graphics object 230 and/or the image 240 to the second application.

As illustrated in FIG. 2, the object 120 may contain a combination of elements, among which may be elements 222, 224, and 226. The object 120 and the elements 222, 224, 226 may be represented in a structure such as the one of FIG. 3. In an example, this structure may include an XML or an HTML tree structure. Although FIG. 2 and the disclosure generally describe the object 120 as having three elements, such a simplified example is provided in the interest of clarity of explanation. The disclosure is not limited as such. Instead, the scope of the disclosure also covers complex structures of object 120 that may include a large number of elements and nesting of elements.

In the interest of clarity of explanation, the object 120 and the elements 222, 224, and 226 are described in the context of a baseball card. Nevertheless, the object 120 and the elements 222, 224, and 226 may not be limited as such and may include any other information and content. As illustrated, the element 222 is the background image of the card, whereas the elements 224 and 226 describes the baseball player. For example, the element 224 may be an image of the player and the element 226 may be text representing the player's name. Thus, each of these elements 222, 224, and 226 may have different content and/or different attributes. In the context of an HTML document (e.g., the document 112 is an HTML document), elements of the HTML document may include well-known HTML elements that may have content, such as text, images, scripts, and other content and attributes, such as cascading style sheets (CSS) style attributes.

There may be situations where image-rendering operations may need to be applied to the object 120 after the document 112 is rendered on the user interface. These image-rendering operations may include, for example, drag and drop, applying a colored multiply effect, or sending an image of the object 120 from computing device 110 to another computing device. However, because the object 120 may be structured in a way that does not allow such operations, the object 120 may not be usable for such operations. For example, when the object 120 is an HTML object and combines text and image elements, it may be necessary to transform the HTML object into an image to apply filters or effects on the image.

Therefore, the application 118 may be configured to locally generate the graphics object 230 from the object 120 such that the graphics object 230 may be usable to support the image-rendering operations. These and other features of the application 118 are further described in the next figures. As such, the application 118 need not rely on a resource external to the computing device 110. Instead, the application 118 may generate the graphics object 230 in a format that may support the image-rendering operations. Further, the application 118 may populate elements of the graphics object 230 to correspond to elements of the object 120, but formatted based on the format of the graphics object 230. In an example, populating the elements of the graphics object 230 may include generating nodes representing these elements to a tree structure of the graphics objects and attaching or appending the elements to the nodes.

For example, and as illustrated in FIG. 2, the graphics object 230 may include elements 232, 234, and 236. The elements 232, 234, and 236 may correspond to the elements 222, 224, and 226 of the object 120, respectively. More particularly, the element 232 may be a background image of the card, the element 234 may be an image of the player, and the element 236 may be text representing the player's name. Thus, the graphics object 230 may provide the same information as the object 120 (e.g., baseball card, with a player image and name). However, the format of this information (e.g., of the elements 232, 234, and 236) can allow the application 118 to render an image (e.g., the image 240) from the graphics object 230. In other words, although the object 120 and the graphics object 230 provide the same information, the content and attributes of the respective elements may follow different formats. For example, if the object 120 is an HTML object, the graphics object 230 may be a SVG object that may present the same information in a different format. However, unlike the HTML object, the graphics object 230 in an SVG format may allow image-rendering operations.

Once the graphics object 230 is generated, the application 118 may generate an image (e.g., the image 240) based on the graphics object 230. This image may be rendered in the document 112 in lieu of or in addition to the object 120 and may be used when image-rendering operations need to be performed. These and other features of the application 118 are further described in the next figures. As such, whereas it may not be possible to locally apply an image-rendering operation to the object 120 as an integrated part of the rendered document 112, such an operation may be applied locally to the image 240 and displayed within or in conjunction with the rendered document 112.

As shown in FIG. 2, the application 118 may use the image 240 when performing a colored multiply effect operation. For example, in response to a user selection of the object 120 and to highlight that the object 120 was selected, the application 118 may render the image 240 in lieu of the object 120 and may use the rendered image 240 to lay a highlighting mask 238 (e.g., a transparent blue color layer) on the user interface.

Figure 3:
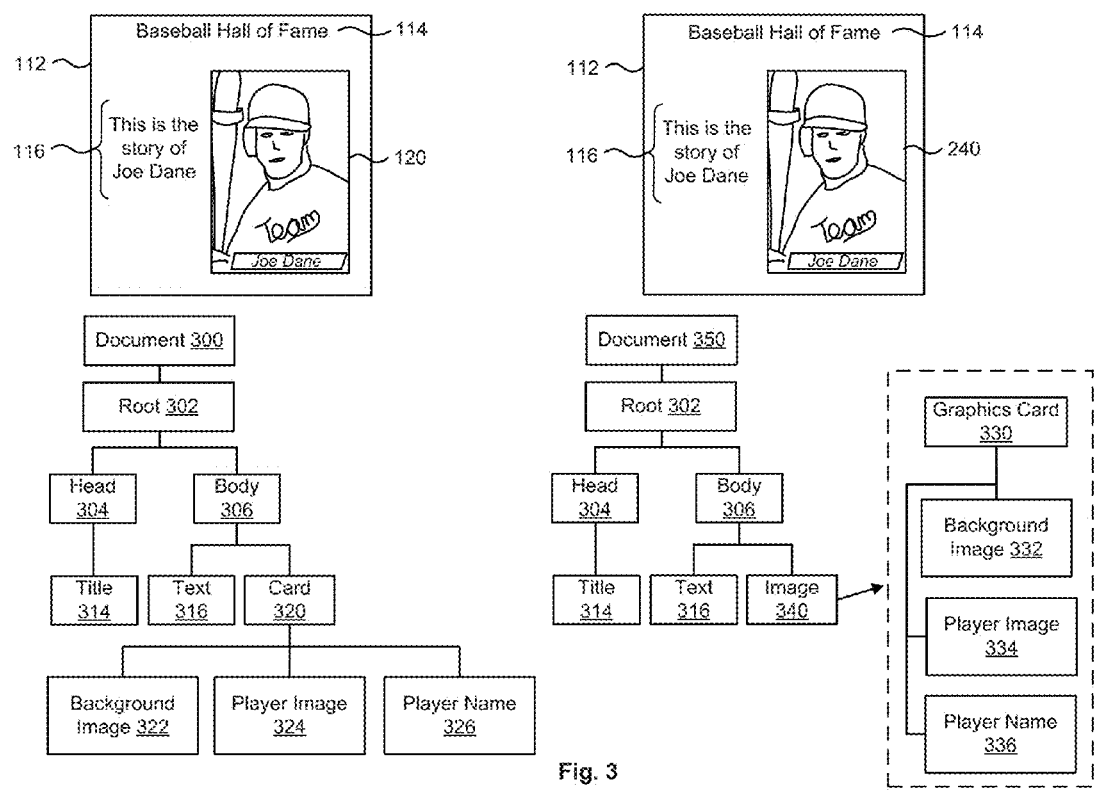
FIG. 3 illustrates example structures of objects, according to certain embodiments of the present invention.

As described herein above, a document 112 may include a number of elements. Similarly, an object 120 may include a combination of elements. Generally, the elements of a document 112 such as a webpage may be represented using a structure, such as a tree structure of a markup document (e.g., XML, HTML, XHTML, or other structured documents). To generate a graphics object 230 and a corresponding image 240, the application 118 may perform operations using the structure of the document 112 or of the object 120. FIG. 3 illustrates examples of this structure.

The structure of the example document 112 may include a logical structure configured in a way that may allow an application 118 not only to process the structure, but also to render the document. For example, the structure may declare a document type (e.g., XML, HTML, XHTML, or other structured documents) to help the application 118 define a rendering mode. Also, the structure may present semantics such as headings, paragraphs, lists, links, quotes, embedded scripts (e.g., JavaScripts), and other items for rendering content of the document. In markup documents, such as XML, HTML, or XHTML documents, the structure may include elements, attributes of the elements, content of the elements, and other data.

Further, the structure may be based on a document object model (DOM) that may define a tree structure for organizing the elements and objects of the document 112. The DOM may be configured to present and interact with objects and elements independently of the language that the objects are written in by defining the elements and objects, the associated properties, and the associated access method. The DOM may also use an application programming interface (API) to allow a tree structure of an object written in one markup language (e.g., HTML) to be used with another markup language (e.g., XML).

To render the document 112, the application 118 may download the document 112 to a local memory and may parse the DOM tree structure. As shown in FIG. 3, a DOM tree structure 300 of document 112 may be used to render the document 112 and may be updated to support rendering of an image 240 in conjunction with the document 112. The DOM structure 300 may include a number of nodes nested in a logical fashion that may define hierarchical relationships between the nodes. The terms parent, child, and sibling may be used to describe the relationships. Parent nodes may have children. Children on the same level may be called siblings. The structure shown in FIG. 3 is illustrative and does not limit the disclosure. For example, other structures, nodes, nesting of nodes may also be used. Further, the computation time to generate the graphics object 230 and/or the image 240 based on the object 120 may depend on the structure. Generally, this computation time may increase with an increase in complexity of the structure of the object 120.

As illustrated, at a top hierarchy, a root node 302 may be a parent node that may have a number of children and that may identify a type of the document 112 (e.g., HTML when the document 112 is an HTML document). A Head node 304 and a body node 306 may be two nodes that are children of the root node 302 and may represent a head section and a body section of the document 112, respectively. The head node 304 may be a parent of a title node 314. The title node 314 may be a child node that may represent the element 114 of the document 112 (e.g., the title node 114 may include the text and the associated attributes of the title). Similarly, the body node 306 may be a parent of two children nodes: text 316 and card 320. In other words, the body node 306 may nest two nodes (the text node 316 and the card node 320) and may represent a main layout of the body section of the document 112. The nodes nested under the body node 306 may further represent the elements within the body section.

The text node 316 may represent the element 116 of the document 112 (e.g., the text node may include the text and the associated attributes of the paragraph within the body of the document 112). The card node 320 may represent the object 120 of the document 112 and, as such, may be a parent of three children: background image 322, player image 324, and player name 326, which collectively may define the baseball card represented in the object 120. The background image node 322 may represent the element 222 of the document 112 (e.g., the background image node 322 may include the background image and the associated attributes of the baseball card represented by the object 120). Similarly, the player image node 324 may represent the element 224 of the document 112 (e.g., the player image node 324 may include the image and the associated attributes of the baseball player of the object 120). In addition, the player name node 326 may represent the element 226 of document the 112 (e.g., the player name node 326 may include the name in text format and the associated attributes of the baseball player of the object 120). As noted above, in the interest of clarity of explanation, the card node 320 is described as having three children nodes. However, the structure of card node 320 may not be limited as such. Instead, the card node 320 node may have additional children nodes, each of which may have a nested structure of children nodes such that the card node 320 may have an overall complex structure.

In response to an event (e.g., a user selection or another event that may identify the object 120 as described herein above), the application 118 may generate a graphics object 230 based on the object 120, and may generate and render an image 240 based on the graphics object 230. To render the image 240 in the rendered document 112, the DOM structure 300 of the document 112 may be updated. The application 118 may execute a script (e.g., a combination of JavaScripts) to perform this update and to render the resulting image 240 in the document 112. The script may be automatically executed in response to the event without an input command from a user and can dynamically update the document 112 with the image 240. For example, the script may render the elements corresponding to the modified nodes of the DOM structure 300 (e.g., the image 240) without refreshing the entire document 112 (e.g., without refreshing the title and the paragraph of the document 112). In another example, the script may refresh the entire document 112 when the update to the DOM structure 300 is complete. Alternatively, the script may be executed based on an input command from the user.

As shown in FIG. 3, a DOM structure 350 illustrates an example update to the DOM structure 300. The DOM structure 350 may include new nodes and/or modify, for instance, certain nodes and/or certain properties of some or all of the nodes of the original DOM structure 300. For example, the DOM structure 350 may include the root 302, head 304, title 314, body 306 and text 316 nodes from the DOM structure 300. These nodes need not be modified because the event (e.g., the user selection) may indicate that only the object 120 is to be processed. In comparison, the application 118 may perform various operations on the card node 320 because the card node 320 represents the object 120 that needs to be processed. For example, the application 118 may replace the card node 320 with an image node 340 (e.g., by using JavaScripts that remove the card node 320 and create the image node 340. This may include creating an image element as further described below, appending the image element to the image node 340, and appending the image node 340 to the body node 306). In another example, the application 118 may not replace the card node 320. Instead, the application 118 may leave or may hide (e.g., by using JavaScripts that hide elements) the card node 320 while also appending the image node 340 to the DOM structure 350.

The image node 340 may be based on a graphics card node 330 that represents the graphics object 230. The image node 340 may represent an image element that corresponds to the graphics object 230. In an example, the content of this image element may be an address to an image stored in local memory of the application 118. The application 118 may generate this image from the graphics object 230.

In turn, the graphics card node 330 that represents the graphics object 230 may be based on the card node 320 that represents the object 120. The application 118 may generate and set the graphics card node 330 according to graphics requirements (e.g., graphics card 330 node may represent a SVG object in lieu of an HTML object and, as such, a namespace of the graphics card node 330 may be set to XML instead of HTML).

The graphics card node 330 may nest multiple nodes that may represent the elements of the graphics object 230. As illustrated, card node 330 may have three child nodes: background image 332, player image 334, and player name 336. These nodes may represent the elements 232, 234, and 236 of the graphics object 230, respectively, which in turn correspond to the elements 222, 224, and 226 of the object 120, respectively.

Further, although not explicitly shown in FIG. 3, graphics card node 330 may have additional nodes. For example, and is further described herein below, when the graphics object 230 is an SVG object, a foreign object may be generated and attached to the graphics object 230 and elements from the object 120 may be used to populate the foreign object. As such, the graphics card node 330 may include a node corresponding to the foreign object. This node may be a child of the graphics card node 330 and may be a parent of the background image node 332, player image node 334, and player name node 336.

Figure 4:
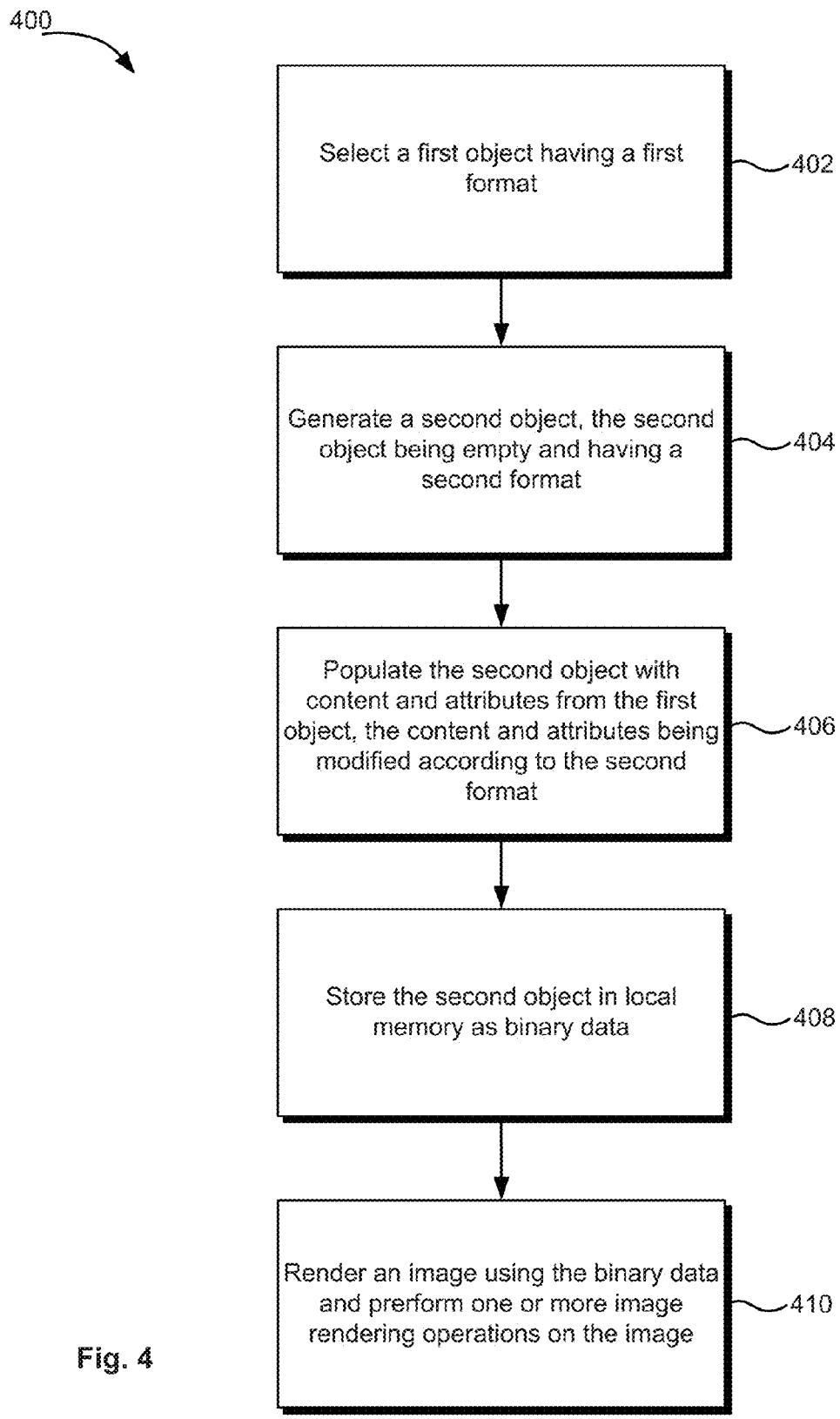
FIG. 4 illustrates an example flow for transforming an object from one format to another format, according to certain embodiments of the present invention.

As described above, the application 118 may use the DOM structure 300 to generate the new DOM structure 350 that can be used to render the image 240 from the graphics object 230. FIG. 4 describes operations that the application 118 may locally perform to generate the graphics object 230 accordingly. Similarly, FIG. 5 describes similar operations that the application 118 may perform within the context of an HTML object. In both figures, the graphics object 230 and the object 120 may have different formats (e.g., the graphics object 230 may be a SVG object, whereas the object 120 may be a HTML object).

To generate the graphics object 230 based on the object 120, application 118 may take advantage of features commonly shared between the corresponding different formats such as common characteristics of the markup languages used to write the objects. For example, with HTML and SVG, the application 118 may be configured to translate between the two markup languages such that HTML content and accompanying attributes (e.g., CSS-based attributes) may be copied and modified, as needed, into content and attributes usable in SVG. In other words, the SVG object may have content set to the HTML content of the HTML object and may have style attributes set to a computed style based on the CSS style of the HTML object.

In the illustrative operations, each of the steps or functions may be embodied in, and fully or partially automated by, code modules executed by one or more processors of computing device 110 of FIG. 1. The code modules may include, for example, the application 118. Also, while the operations are illustrated in a particular order, it should be understood that no particular order is necessary and that one or more operations may be omitted, skipped, and/or reordered. Further, in the interest of clarity of explanation, the application 118 is described as performing the illustrative operations. Nevertheless, other or additional code modules of computing device 110 may be configured to implement one or more of the operations and/or one or more steps of the operations.

Turning to FIG. 4, that figure illustrates an example flow 400 for generating a graphics object to support image-rendering operations. For example, in response to an event (e.g., a user selection of object 120), application 118 may execute flow 400 to generate the graphics object 230 locally based on the object 120 in a format that supports image-rendering operations.

The flow 400 starts at operation 402, where a first object having a first format is selected. In other words, the application 118 may receive or determine an event that may require the processing of the first object at this operation. The first object may include a number of nested elements, each of which may have content and attributes. The content may include, for example, text, images, audio, video, multimedia, animations, scripts, links, and other types of content. Each attribute may include, for example, properties for displaying the elements such as styles or a reference to a style sheet. The first format may be based on, for instance, a markup language. An example of the first object may include the object 120 of FIG. 1.

At operation 404, the application 118 may generate a second object, where the second object may be initially empty and may have a second format. An empty object may be an object that may not have elements but that may be populated with elements and the corresponding content and attributes. The second object may be a graphics object, such as an object that, when populated with elements, may support image-rendering operations. While also based on a markup language, the second format may be different from the first format such that, if the first format does not support image-rendering operations, the second format may do so. An example of the second object, when populated, may include the graphics object 230 of FIG. 2. At this operation, the application 118 may invoke a function that may generate a node that may represent the second object and that may have a namespace configured to support image-rendering operations (e.g., an XML namespace—XMLNS—that may support a SVG object).

At this operation, the application 118 may also compute a size (e.g., width and height attributes) of the second object based on a size of the first object. This may involve, for example, performing a query to determine the size of the first object.

At operation 406, the application 118 may populate the second object with content and attributes from the first object, where the content and/or attributes may be modified according to the second format. For example, application 118 may attach elements to the second object, each of which may correspond to one or more elements of the first object. The content and attributes of the attached elements may be modified to meet the second format. Said differently, the application 118 may modify the content and/or attributes of each attached element such that the content and/or attributes are written according to the second format. For example, whereas the content of the elements of the first object may be copied, application 118 may compute attributes of the attached elements based on the attributes of the corresponding elements of the first object. To do so, for each attached element, application 118 may invoke a DOM API call to receive a computed style for the attached element from the style of the corresponding one or more elements of the first object and may insert the computed style in the attribute of the attached element.

Additionally, the application 118 may use a third object configured to use a second namespace (e.g., an XHTML namespace) that may allow application 118 to draw graphical content within the second namespace. The elements may be attached to this third object instead of being directly attached to the second object, and, in turn, the third object may be attached to the second object. This nesting may allow application 118 to use different namespaces (e.g., XML and XHTML) such that the second object can support image-rendering operations.

At operation 408, the application 118 may store the second object as binary data in a local memory of the application 118. In this operation, the application 118 may take advantage of the second format of the second object, where the second format may allow the second object to be stored as binary data. For example, the application 118 may append a media type (e.g., an image type) to the second object, may transform the appended information and the second object into a binary large object (BLOB), and may store the BLOB at a location in the local memory. Further, the application 118 may generate an address (e.g., a universal record locator—URL—that may be local to the application 118) that may identify the location. For example, the application 118 may execute a JavaScript to request the URL of the BLOB. The BLOB and the address may allow the application 118 to perform image-rendering operations based on the second object. For example, the application 118 may attach an image element (e.g., an element that includes image as content) to the document 112 (e.g., DOM structure 300 may be modified such that DOM structure 350 includes the image node 340, where the image element is appended to the image node 340). The application 118 may set a source of such image element or image object to the address of the BLOB.

At operation 410, the application 118 may render an image using the binary data and may perform one or more image-rendering operations (e.g., the application 118 may render the image 240 in the rendered document 112). For example, by using the local in-memory address of the BLOB, the application 118 may render an image that may display the content of the second object using the corresponding attributes. The one or more image-rendering operations may include, for example, applying a colored multiply effect as shown in FIG. 2, drag and drop, sending the image to a remote computing device, or any other image-rendering operations. The rendered image may also be used with other operations. For example, a right click and save operation may be performed to store the image in a memory space of computing device 110.

Figure 5:
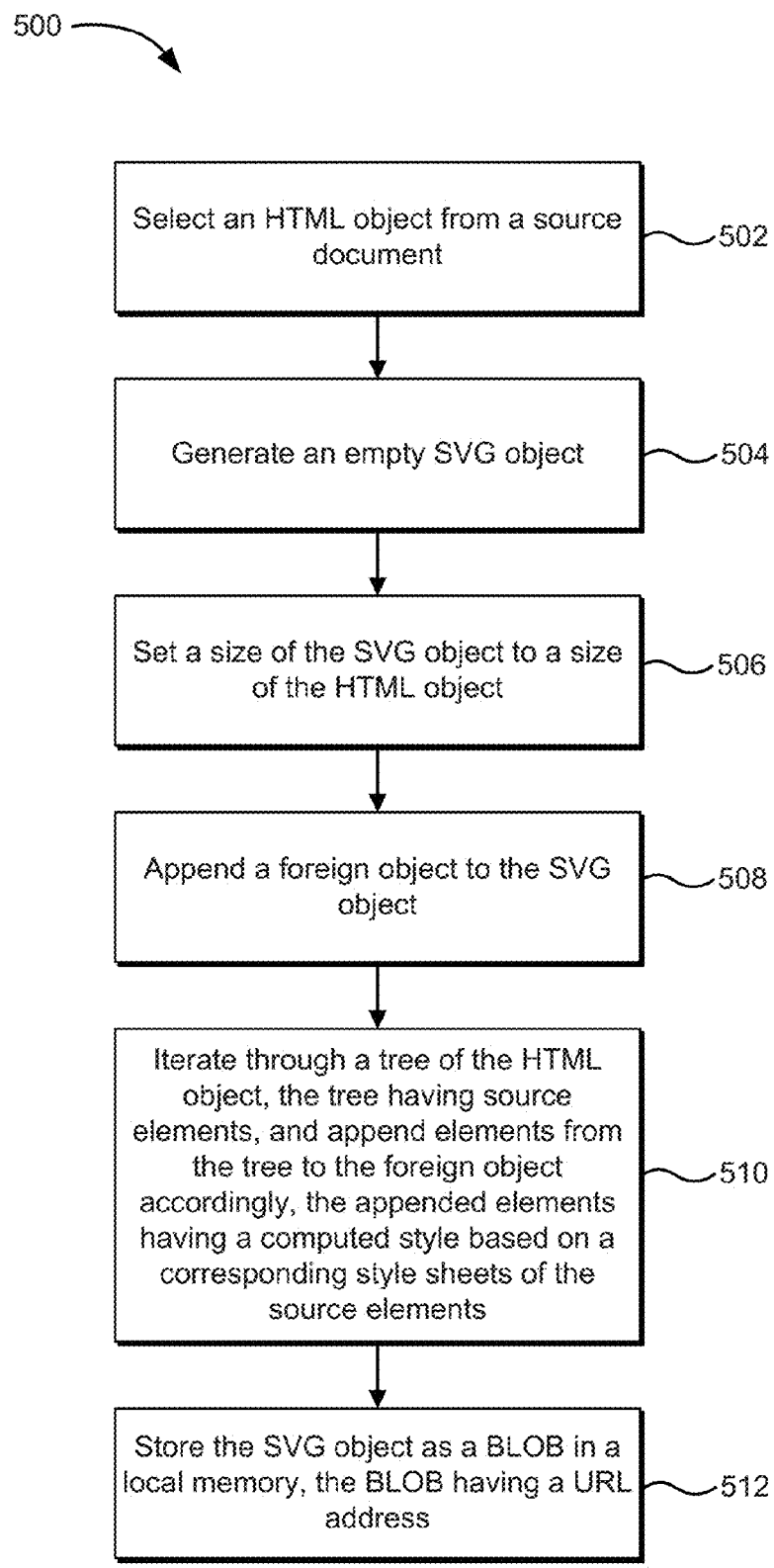
FIG. 5 illustrates another example flow for transforming an object from one format to another format, according to certain embodiments of the present invention.

Turning to FIG. 5, that figures illustrates an example flow 500 for generating an object to support image-rendering operations. More particularly, the application 118 may locally execute the flow 500 to render an image out of an HTML object when it may be necessary to transform the HTML into an image as discussed herein above. For example, the flow 500 may be executed when the object 120 and the graphics object 230 are HTML and SVG objects, respectively. Further, the flow 500 may include similar operations as those shown in the flow 400. In the interest of clarity of explanation, such similarities may not be repeated here. In addition, under the flow 500, the application 118 may be a browser of a computing device, such as a portable computing device, that has a local memory.

Generally, the application 118 may use an HTML object as an input to the flow 500 and may generate an SVG object as an output of the flow 500. Content and attributes of the SVG object may be used to support image-rendering operations. More specifically, the flow 500 may allow the application 118 to import HTML content from the HTML object into the content of the SVG object. In addition, the flow 500 may allow application 118 to compute styles based on the CSS styles of the HTML object and to insert the computed styles into the "style" attributes of the SVG object. This transformation between the HTML object and the SVG object may take advantage of the DOM tree structure and may also use a foreign object. The foreign object may allow the application 118 to render the imported content as XHTML using, at least in part, the inserted computed styles.

The flow 500 starts at operation 502, where an HTML object is selected from a source document. In other words, the application 118 may receive or determine an event that may require the processing of the HTML object at this operation. The HTML object may have a certain size (e.g., height and width attributes) and may include a number of elements, each of which may have content and attributes. For example, when the object 120 is an HTML object, the size of the HTML object may correspond to the size of the baseball card shown in FIGS. 1 and 2 and the elements may correspond to the image background, the player image, and the name of the player. The content of each element may be an image or a text. The attributes of each of element may include, for example, an "id" attribute configured to provide a document-wide unique identifier for the element, a "class" attribute configured to classify the element, a "style" attribute configured to assign presentational properties to the element, and other attributes. In certain implementations, the "id," "class," and/or "style" attribute may select a style for an element from a style sheet, such as from cascading style sheets (CSS).

At operation 504, the application 118 may generate an empty SVG object in response to, for example, the event determined at operation 502. To do so, the application 118 may, for example, generate and store the empty SVG object as an object or a file in the local memory of the application 118, and may execute a CreateElementNS method to define a namespace for an XML representation of the SVG object. The createElementNS method may create an object node within an XML namespace. The application 118 may define the XML namespace to the SVG 1.0 specification.

At operation 506, the application 118 may set a size of the SVG object (e.g., height and width attributes) as a function of the size of the HTML object. For example, the SVG object and the HTML object may have the same size, as shown in FIGS. 1 and 2. In another example, the SVG object's size may be a percentage of the HTML object's size. For instance, with a drag and drop operation, the SVG object's size may be set to 60%, any other percentage, or any other available unit for declaring the HTML object's size. This may allow the SVG object to be rendered in a smaller size, which may allow a user-friendly implementation of drag and drop operations. To set the SVG's object size, the application 118 may retrieve the HTML object's size by reading a computed style of the HTML object with a JavaScript query.

At operation 508, the application 118 may append a foreign object to the SVG object. Generally, SVG may allow inclusion of elements from a foreign namespace anywhere with SVG content and of attributes from the foreign namespace on any SVG element or SVG object. The foreign object may be referred to as a foreignObject and may allow inclusion of a foreign XML namespace, which may have graphical content drawn by a SVG user agent. The included foreign graphical content may be subject to SVG transformations and compositing. The content of the foreignObject may be assumed to be from a different namespace. Any SVG elements within a foreignObject may be drawn in situations where a properly defined SVG subdocument with a proper XMLNS attribute specification is embedded recursively. An example of such situations includes an implementation where an SVG document fragment is embedded within another non-SVG document fragment, which in turn is embedded within an SVG document fragment (e.g., an SVG document fragment contains an XHTML document fragment which in turn contains yet another SVG document fragment).

As such, the application 118 may use the XML namespace of the SVG object to set the foreign object namespace to the XHTML 1.0 specification, which may allow the application 118 to render content attached to the foreign object through a rendering engine. In other words, by setting the SVG object's namespace to XML and the foreign object's namespace to XHTML, the application 118 may render the elements attached to the foreign object, which in turn may be attached to the SVG object, as a vector graphic.

At operation 510, the application 118 may iterate through the tree of the HTML object (e.g., nodes 320 through 326 of FIG. 3 for the object 120) to append elements from the HTML object to the foreign object. For each element of the HTML object, the application 118 may generate a new element of the same type and may read the computed style of the original element. The new element may be formatted according to XHTML and may include content of the original element and attributes determined based on, for example, the computed style of the original element (e.g., CSS style). As such, the new element may include, for example, content and a "style" attribute. Content of the original element may be copied into the content of the new element. Similarly, the CSS style of the original element may be computed and the computed style may be inserted in the "style" attribute of the new element.

The computed style may be received through a DOM API as a key-value structure. The DOM-API may allow the application 118 to use JavaScripts to access nodes of the HTML object at a DOM structure (e.g., the DOM structure 300 for the object 120) for computing the key-value structure. This structure may include a number of key-value pairs, each of which may represent a styling attribute (e.g., background color, font color, font size, location within document 112, and other attributes). The key-value structure may be flattened by looping over the new elements and by adding, for each new element, a description of the corresponding computed style as an inline string into an attribute of the new element. Flattening a key-value structure may include expressing the key-value pairs within that structure as a string of pairs in the "style" attribute of the new element. As an example and for an element that has N key-value pairs, the corresponding string may expressed as: style="key1: value 1; key2: value 2; . . . ; keyN: valueN;". When the iteration is complete, a tree of the foreign object may be identical to the tree of the HTML object, but each node (e.g., element) within the tree of the foreign object may contain the whole styling of that node in the respective attribute.

At operation 512, the application 118 may store the SVG object, including the appended foreign object and the appended elements, as a BLOB having an SVG MIME type (e.g., "image/svg+xml") in a local memory of the application 118. The BLOB may be stored at a location of the memory addressable using, for example, a URL. At this operation, the application 118 may also attach a new image element to the document 112 with a source set to the URL of the BLOB. By setting the URL, the application 118 may start rendering an image, including any HTML content, into the local memory as an SVG. When the rendering is complete, a load event may be fired on the image element or image object. A handler may listen to the load event and, in response, may draw the rendered SVG into a canvas (e.g., an HTML5 canvas) using, for example, a drawImage method and may release the memory space storing the BLOB. At this point, a pixel value representation may be successfully generated allowing image-rendering operations to be performed. For example, image transformations on the canvas may be applied. In another example, the canvas may be extracted into a raster image format through a toDataURL method to return a base64 encoded output.

To illustrate portions of the above the flow 500, two examples of markup language code are provided herein below. In the first example, the object 120 is an HTML object and illustrates an input to the flow 500 (e.g., at the operation 502). In the second example, the graphics object 230 is a SVG object that uses XML namespacing and computed styling and illustrates an output of the flow 500 (e.g., at the operation 510) based on the input of the first example. The two examples are provided for illustrative purposes and are not meant to limit the disclosure.

In the first example, the object 120 may represent a baseball card of a player, Joe Dane, as follows:

```
<article class="baseball-card">
    <a href="/content/player/joe-dane.html">
        <span class="image">
            <img src="/content/dam/joe-dane.thumb.319.319.png" />
        </span>
        <div class="label">
            <h4 class="player">Joe Dane</h4>
            <div class="info">
                <p class="story">This is the story of Joe Dane</p>
            </div>
        </div>
    </a>
</article>
```

In the second example, the object graphics 230 may represent a transformation of the object 120 such that the HTML may be rendered in a SVG.

```
<svg xmlns="http://www.w3.org/2000/svg" width="268" height="348">
    <foreignObject width="100%" height="100%"
xmlns="http://www.w3.org/1999/xhtml">
        <article class="baseball-card" style="background-color: #FFFFFF; color:
#4B4B4B; width: 268px; display:block;">
            <a href="/content/player/joe-dane.html" style="color: rgba(0, 0, 0, 0.4);">
                <span class="image" style="border-bottom-width: 1px; border-bottom-
color: rgba(0, 0, 0, 0.1); border-bottom-style: solid;">
                    <img src="/content/dam/joe-dane.thumb.319.319.png" style="width:
268px; height: 268px;" />
                </span>
                <div class="label" style="margin-bottom: 5px;">
                    <h4 class="player" style="font-weight: 700; font-size: 12px; line-
height: 18px; text-overflow: ellipsis; margin-top: 6px; margin-right: 10px; margin-bottom:
6px; margin-left: 10px;">Joe Dane</h4>
                    <div class="info">
                        <p class="story" style="margin-top: -7px; margin-right: 10px;
margin-bottom: 6px; margin-left: 10px;">This is the story of Joe Dane</p>
                    </div>
                </div>
            </a>
        </article>
    </foreignObject>
</svg>
```

Figure 6:
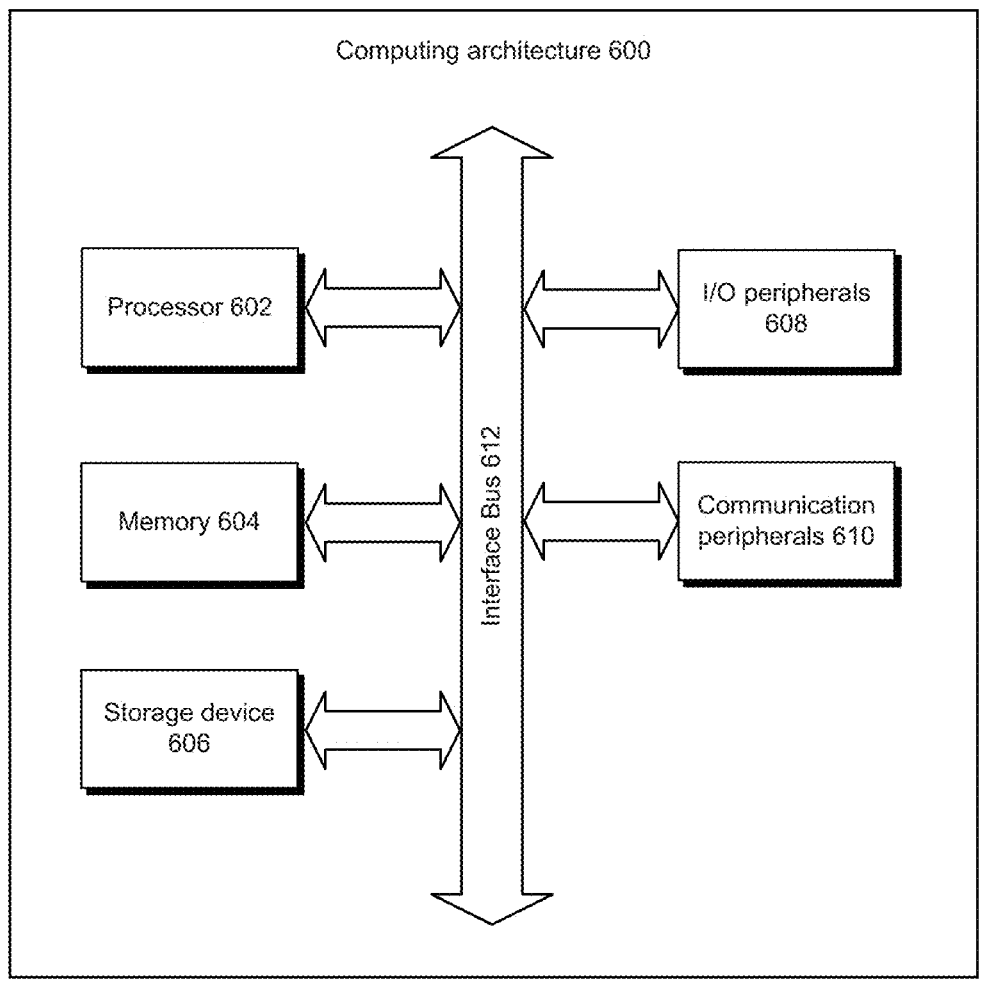
FIG. 6 illustrates an example computing architecture in which various embodiments of the present invention can be implemented.

To implement the various functionalities of computing device 110, some or all elements of the device may be implemented using the computing architecture of FIG. 6. More particularly, FIG. 6 illustrates an example computing architecture 600 for implementing the techniques in accordance with the present disclosure. As used herein, the term "circuitry" includes hardware components (e.g., microprocessors, application specific integrated circuits, processors, etc.) configured using firmware and software that implement the techniques described herein. For example, a processor can be configured by instructions loaded from memory, e.g., random access memory (RAM), read-only memory (ROM), firmware, and/or mass storage, embodying logic operable to configure the processor to perform the functionalities disclosed herein.

FIG. 6 illustrates an example of computing architecture 600 that may include at least a processor 602, a memory 604, a storage device 606, input/output peripherals 608, communication peripherals 610, and an interface bus 612. The interface bus 612 may be configured to communicate, transmit, and transfer data, controls, and commands among the various components of the computing architecture 600. The memory 604 and the storage device 606 may comprise computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 604 and the storage device 606 may also comprise computer readable signal media. A computer readable signal medium may include a propagated data signal with computer readable program code embodied therein. Such a propagated signal may take any of a variety of forms including, but not limited to, electromagnetic, optical, or any combination thereof. A computer readable signal medium may be any computer readable medium that is not a computer readable storage medium and that can communicate, propagate, or transport a program for use in connection with the computing architecture 600.

Further, the memory 604 may comprise an operating system, programs, and applications. The processor 602 may be configured to execute the stored instructions and can comprise, for example, a logical processing unit, a microprocessor, a digital signal processor, and other processors. The input and output peripherals 608 may include user interfaces such as a keyboard, screen, microphone, speaker, other input/output devices, and computing components such as graphical processing units, serial ports, parallel ports, universal serial bus, and other input/output peripherals. The input/output peripherals 608 may be connected to the processor 602 through any of the ports coupled to the interface bus 612. The communication peripherals 610 may be configured to facilitate communication between the computing architecture 600 and other computing devices over a communications network and may include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method comprising:
receiving, by a computing device executing a browser, a request for performing an image-rendering operation on a hypertext markup language (HTML) object in an HTML document rendered in the browser;
generating, by the browser, a scalable vector graphics (SVG) object in response to the request;
transforming, by the browser, the HTML object into an image based on the SVG object;
storing, by the browser, the image in a local memory of the computing device;

attaching, by the browser, an image element to the HTML document at a location of the HTML object, the image element referencing the image in the local memory of the computing device;

refreshing, by the browser, the rendered HTML document by rendering the image based on the image element; and performing, by the browser, the image-rendering operation on the image.

2. The computer-method of claim 1, wherein the HTML object comprises one or more HTML elements having a presentation style based on cascading style sheets (CSS), and wherein generating the SVG object comprises:

generating one or more SVG elements corresponding to the one or more HTML elements, the one or more SVG elements being formatted based at least in part on a SVG format and having a SVG style based at least in part on the presentation style of the HTML elements;

attaching the one or more SVG elements to the SVG object; and storing the SVG object as binary data in a location at the local memory of the computing device, the location allowing the browser to render the image from the binary data.

3. The computer-method of claim 2, wherein the browser comprises a web browser of a portable computing device.

4. The computer-method of claim 2, wherein the SVG style is based at least in part on the presentation style by using a document object model (DOM) application programming interface (API).

5. The computer-implemented method of claim 4, wherein the DOM API computes a key-value pair of the presentation style, and wherein the SVG style comprises a string descriptive of the key-value pair.

6. The computer-method of claim 2, wherein the HTML object and the SVG object have a same presentation size.

7. The computer-method of claim 2, wherein attaching the one or more SVG elements to the SVG object comprises:

iterating through the one or more HTML elements to generate the one or more SVG elements; and attaching the one or more SVG elements to the SVG object.

8. The computer-implemented method of claim 2, wherein the image element has a source set to an address in the local memory, wherein the address stores the image.

9. A system comprising:
a processor;
a non-transitory computer-readable storage medium communicatively coupled to the processor and bearing instructions that, upon execution by the processor, cause the system to at least:

execute an application for rendering an HTML document;

identify, by the application, an HTML object of the HTML document rendered by the application, the HTML object being identified in association with an image-rendering operation;

generate, by the application, a scalable vector graphics (SVG) object based on the HTML object;

generate, by the application, an image based on the SVG object;

store, by the application, the image in a location of the memory;

attach, by the application, an image element to the HTML document, the image element being attached at a location of the HTML object;

render in the HTML document, by the application, the image based on the image element referencing the image stored in the location of the memory; and perform, by the application, the image-rendering operation on the image.

10. The system of claim 9, wherein generating the image comprises:

in response to the identification of the HTML object, generating the SVG object, the SVG object being empty;

adding SVG elements to the SVG object based at least in part on HTML elements of the HTML object;

storing the SVG object as binary data in a location of the memory, the binary data comprising data representative of the SVG elements; and generating the image from the binary data.

11. The system of claim 10, wherein the HTML object comprises at least a text element.

12. The system of claim 10, wherein the SVG elements comprise at least a text element and an image element, wherein each of the text element and the image element comprises at least content and an attribute.

13. The system of claim 12, wherein an attribute of an SVG element of the SVG elements is based at least in part on an attribute of an HTML element of the HTML elements, and wherein the attribute of the SVG element comprises a string indicative of a computed key-value pair of the attribute of the HTML element.

14. The system of claim 12, wherein an attribute of a SVG element of the SVG elements is generated from an attribute of an HTML element of the first elements based at least in part on a SVG format.

15. The system of claim 10, wherein storing the SVG object as the binary data in the location of the memory allows the application to render image from the SVG object.

16. A non-transitory computer-readable storage medium storing instructions that, when executed by a computing device, cause the computing device to perform operations comprising:

executing an application for rendering an HTML document;

identifying an HTML object in the HTML document rendered by the application;

generating a scalable vector graphics (SVG) object based on the HTML object;

transforming the HTML object into an image based on the SVG object to support an image rendering-operation;

storing the image in a local memory of the computing device;

attaching an image element to the HTML document, the image element referencing the image in the local memory and attached a location of the HTML object in the HTML document; and rendering the image based on the image element in the HTML document at the location of the HTML object.

17. The computer-readable storage medium of claim 16, wherein the HTML object comprises one or more HTML elements, and wherein transforming the HTML object into the image comprises:

populating the SVG object with one or more SVG elements, the one or more SVG elements corresponding to the one or more HTML elements and being modified based at least in part on a SVG format; and causing the SVG object to be stored as the image in the local memory of the computing device.

18. The computer-readable storage medium of claim 17, wherein the one or more HTML elements comprise at least a first text element and a first image element, and wherein the one or more SVG elements comprise at least a second text element and a second image element corresponding to the first text element and the first image element, and wherein rendering the image element comprises rendering the second text element and the second image element as portions of the image.

19. The computer-readable storage medium of claim 17, wherein causing the SVG object to be stored as the image comprises:
   generating binary data from the SVG object;
   storing the binary data in the local memory of the computing device; and
   setting a source of the image element to an address of the local memory storing the binary data.

20. The computer-readable storage medium of claim 19, further comprising instructions that, when executed by the computing device, configure the computing device to perform operations comprising:
   drawing the SVG object in a HTML canvas based on the binary data; and
   releasing the binary data from the local memory.

* * * * *